US009209816B2

(12) United States Patent
Penzes et al.

(10) Patent No.: US 9,209,816 B2
(45) Date of Patent: Dec. 8, 2015

(54) PRE-HEATING FOR REDUCED SUBTHRESHOLD LEAKAGE

(71) Applicant: Broadcom Corporation, Irvine, CA (US)

(72) Inventors: Paul Penzes, Irvine, CA (US); Mark Fullerton, Austin, TX (US)

(73) Assignee: Broadcom Corporation, Irvine, CA (US)

( * ) Notice: Subject to any disclaimer, the term of this patent is extended or adjusted under 35 U.S.C. 154(b) by 173 days.

(21) Appl. No.: 14/041,505

(22) Filed: Sep. 30, 2013

(65) Prior Publication Data

US 2014/0028344 A1    Jan. 30, 2014

Related U.S. Application Data

(63) Continuation of application No. 13/247,694, filed on Sep. 28, 2011, now Pat. No. 8,575,993.

(60) Provisional application No. 61/524,538, filed on Aug. 17, 2011.

(51) Int. Cl.
| | |
|---|---|
| *H01L 35/00* | (2006.01) |
| *H03L 7/08* | (2006.01) |
| *H03K 3/03* | (2006.01) |
| *H03K 3/037* | (2006.01) |
| *H03K 19/01* | (2006.01) |
| *G06F 12/14* | (2006.01) |
| *G06F 21/44* | (2013.01) |
| *H03K 5/13* | (2014.01) |
| *H03L 7/097* | (2006.01) |
| *H03L 7/099* | (2006.01) |
| *G06F 1/32* | (2006.01) |
| *G06F 1/26* | (2006.01) |
| *H03K 5/00* | (2006.01) |

(52) U.S. Cl.
CPC ............... *H03L 7/0802* (2013.01); *G06F 1/32* (2013.01); *G06F 12/14* (2013.01); *G06F 21/44* (2013.01); *H03K 3/0315* (2013.01); *H03K 3/0375* (2013.01); *H03K 5/133* (2013.01); *H03K 19/01* (2013.01); *H03L 7/097* (2013.01); *H03L 7/0997* (2013.01); *G06F 1/26* (2013.01); *G06F 1/3203* (2013.01); *G06F 1/3228* (2013.01); *H01L 2924/0002* (2013.01); *H03K 2005/00026* (2013.01); *H03K 2005/00058* (2013.01)

(58) Field of Classification Search
CPC ....... G06F 1/08; G06F 1/206; G06F 11/3058; G06F 11/3062
See application file for complete search history.

(56) References Cited

U.S. PATENT DOCUMENTS

| | | | |
|---|---|---|---|
| 5,502,838 | A | 3/1996 | Kikinis |
| 6,815,643 | B2 | 11/2004 | Der Ropp |

(Continued)

*Primary Examiner* — Jeffrey Zweizig
(74) *Attorney, Agent, or Firm* — Sterne, Kessler, Goldstein & Fox P.L.L.C.

(57) ABSTRACT

Certain semiconductor processes provide for the use of multiple different types of transistors with different threshold voltages in a single IC. It can be shown that in certain ones of these semiconductor processes, the speed at which high threshold transistors can operate at decreases with decreasing temperature. Thus, the overall processing speed of an IC that implements high threshold transistors is often limited by the lowest temperature at which the IC is designed (or guaranteed) to properly function. Embodiments of a system and method that overcome this deficiency by "pre-heating" the IC (or at least portions of the IC that implement the high threshold transistors) such that the IC can operate at a frequency (once pre-heated) higher than what would otherwise be possible for a given, minimum temperature at which the IC is designed (or guaranteed) to properly function at are provided.

19 Claims, 7 Drawing Sheets

(56) References Cited

U.S. PATENT DOCUMENTS

| | | |
|---|---|---|
| 6,908,227 B2 | 6/2005 | Rusu et al. |
| 7,023,757 B2 * | 4/2006 | Watanabe et al. ............. 365/227 |
| 7,149,645 B2 | 12/2006 | Mangrulkar et al. |
| 7,822,998 B2 * | 10/2010 | Cai ............................... 713/322 |
| 7,887,235 B2 | 2/2011 | Campos et al. |
| 8,089,180 B2 | 1/2012 | Takahashi et al. |
| 8,354,875 B2 | 1/2013 | Zhang et al. |

* cited by examiner

PRE-HEATING FOR REDUCED SUBTHRESHOLD LEAKAGE

CROSS REFERENCE TO RELATED APPLICATIONS

This application is a continuation of U.S. patent application Ser. No. 13/247,694 filed Sep. 28, 2011, which claims the benefit of U.S. Provisional Patent Application No. 61/524,538, filed on Aug. 17, 2011, all of which are incorporated herein by reference in their entireties.

FIELD OF THE INVENTION

This application relates generally to integrated circuits and, more particularly to, integrated circuits with pre-heating.

BACKGROUND

FIG. 1 illustrates an exemplary structure of an n-type Field Effect Transistor (FET) (i.e., a FET where the free carriers are negatively charged electrons). In the n-type FET illustrated in FIG. 1, a conducting gate is separated from a p-type semiconductor body by a thin insulating layer. When a low positive voltage, is applied to the gate, holes in the p-type semiconductor body are repelled away from the surface of the gate and electrons in the p-type semiconductor body are attracted to the surface of the gate. This scenario is illustrated in FIG. 2.

As the voltage on the gate is increased, more and more electrons are attracted to the surface of the gate. When the voltage on the gate, relative to the source, increases beyond a threshold voltage ($V_{tn}$), the number of electrons becomes greater than the number of holes near the surface of the gate. Isis commonly referred to as an inversion layer and is illustrated in FIG. 3. The inversion layer provides a conducting path of electron carriers and permits the flow of electrical current from source to drain. The FET is said to be ON when the current is able to flow between the source and drain and OFF when the current is (ideally) stopped by decreasing the gate voltage, relative to the source, below $V_{tn}$.

A p-type FET (i.e., a FET where the free carriers are positively charged holes) with a conducting gate separated from an n-type semiconductor body by a thin insulating layer, works in a complimentary way to an n-type FET: as the voltage on the gate, relative to the source, is decreased, more and more holes are attracted to the surface of the gate, and when the voltage on the gate, relative to the source, decreases beyond a threshold voltage ($V_{tp}$), the number of holes becomes greater than the number of electrons near the surface of the gate and an inversion layer is formed. In the p-type FET, the inversion layer provides a conducting path of positive carriers (i.e., holes) and permits the flow of electrical current from source to drain. The p-type FET is said, to be ON when the current is able to flow between the source and drain and OFF when the current is (ideally) stopped by increasing the gate voltage, relative to the source, above $V_{tp}$.

Consider the n-type and p-type FETs illustrated in FIG. 4. The two transistors are arranged to form an inverter. The supply voltage (Vdd) is assumed to be 1.2 V, ground (Vss) is assumed to be 0 V, $V_{tn}$ of the n-type FET is assumed to be equal to 0.4 V, $V_{tp}$ of the p-type FET is assumed to be equal to −0.4 V, logic '1' is assumed to be approximately equal to Vdd, and logic '0' is assumed to be approximately equal to Vss.

In a first scenario 401, the input to the inverter is Vss or logic '0', and the gate to source voltage of the n-type FET is Vss–Vss or 0 V, which is below $V_{tn}$ turning the n-type FET OFF. The gate to source voltage of the p-type FET is Vss–Vdd or −1.2 V, which is below $V_{tp}$ turning the p-type FET ON. Thus, because the n-type FET is OFF and the p-type FET is ON, the output voltage is pulled up to Vdd or logic '1'. In a second scenario 403, the input is Vdd or logic '1', and the gate to source voltage of the n-type FET is Vdd–Vss or 1.2 V, which is above $V_{tn}$ turning the n-type FET ON. The gate to source voltage of the p-type FET is Vdd–Vdd or 0 V, which is above $V_{tp}$ turning the p-type FET OFF. Thus, because the n-type FET is ON and the p-type FET is OFF, the output voltage is pulled down to Vss or logic '0'.

Note that one of the two transistors in FIG. 4 is always OFF in either scenario 401 or 403. Ideally, no current flows through the OFF transistor so that power dissipation is zero when the input to the inverter is held constant (i.e., there is no static power dissipation). This is a principle advantage of using p-type and n-type FETs in a complimentary manner to construct a logic gate, such as the inverter illustrated in FIG. 4. However, secondary effects, including subthreshold conduction, lead to current flowing through the OFF transistor. In general, subthreshold leakage current (i.e., current that flows through an n-type FET when the gate to source voltage is below $V_{tn}$, and current that flows through a p-type FET when the gate to source voltage is above $V_{tp}$) is inversely and exponentially dependent on threshold voltage and has increased dramatically over time as threshold voltages of transistors have scaled down with process technology geometries. Although transistors with lower threshold voltages have comparatively more subthreshold leakage current and therefore result in higher static power dissipation, these transistors are faster and can be run at higher frequencies.

To combat the increased static power consumption of lower threshold transistors, integrated circuits (ICs) are often implemented using multiple types of transistors with varying threshold values. Faster, lower threshold transistors can be used on the critical path of a circuit to meet timing, whereas lower threshold transistors can be used on non-critical paths of the circuit to improve subthreshold leakage and the overall static power consumption of the IC. The critical path of a circuit can be generally defined as the longest path (in terms of signal propagation) between sequential storage elements like flip-flops or latches. FIG. 5 illustrates this concept, with low threshold transistors being used in logic on a critical path of a circuit 500, and high threshold transistors being used in logic on a non-critical path of circuit 500.

It can be shown, however, that in certain processes, the speed at which high threshold transistors can operate at decreases with decreasing temperature. Thus, the overall processing speed of an IC that implements high threshold transistors is often limited by the lowest temperature at which the IC is designed (or guaranteed) to properly function.

Therefore what is needed is a system and method to "preheat" the IC in order to improve the speed at which an IC that implements high threshold transistors can properly function.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the invention. However, it will be apparent to those skilled in the art that the invention, including structures, systems, and methods, may be practiced without these specific details. The description and representation herein are the common, means used by those experienced or skilled in the art to most effectively convey the substance of their work to others skilled in the art. In other instances, well-known methods, procedures, components, and circuitry have not been described in detail to avoid unnecessarily obscuring aspects of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Various aspects are described herein in connection with a terminal, which can also be referred to as a subscriber unit, subscriber station, mobile station, mobile device, remote station, remote terminal, access terminal, user terminal, terminal, user device, or user equipment, for example.

I. EXAMPLE OPERATING ENVIRONMENT

Figure 1:
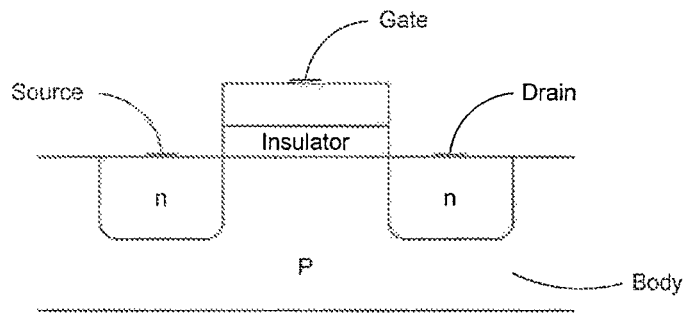
FIG. 1 illustrates an exemplary structure of an n-type FET.
Figure 2:
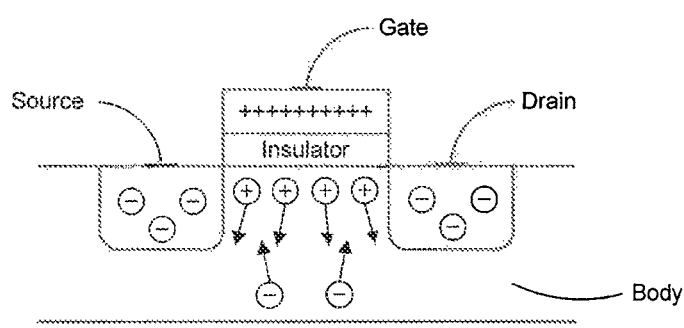
FIG. 2 illustrates an exemplary structure of an n-type FET with a low positive voltage applied to the gate.
Figure 3:
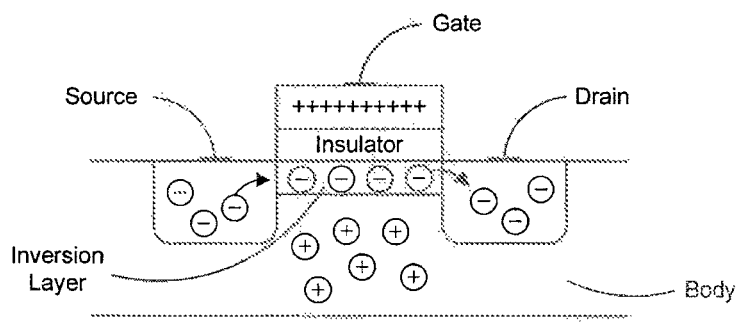
FIG. 3 illustrates an exemplary structure of an n-type FET with a positive voltage applied to the gate that is greater than the threshold voltage of the FET.
Figure 4:
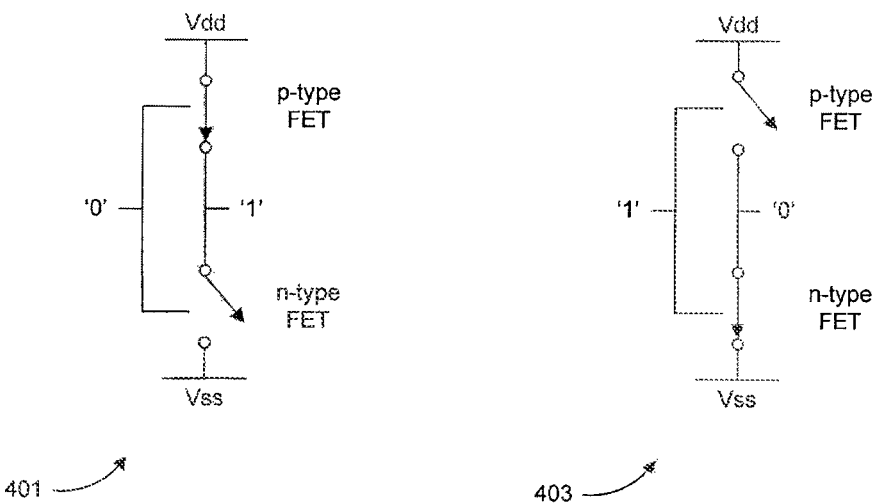
FIG. 4 illustrates an exemplary inverter during its states of operation.
Figure 5:
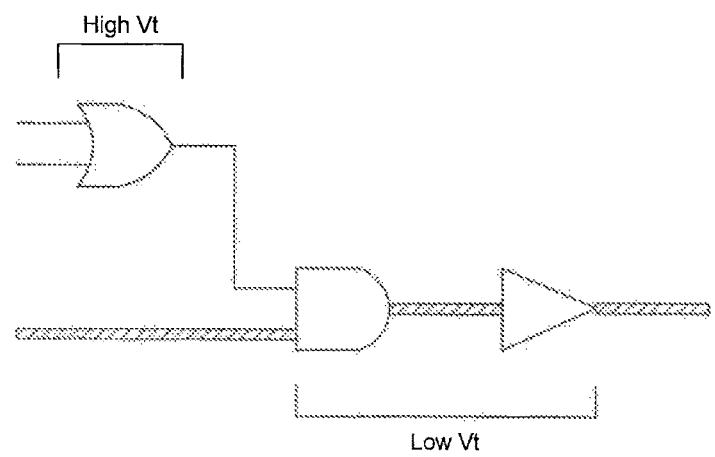
FIG. 5 illustrates an exemplary circuit that implements high threshold transistors in a non-critical path and low threshold transistors in a critical path.
Figure 6:
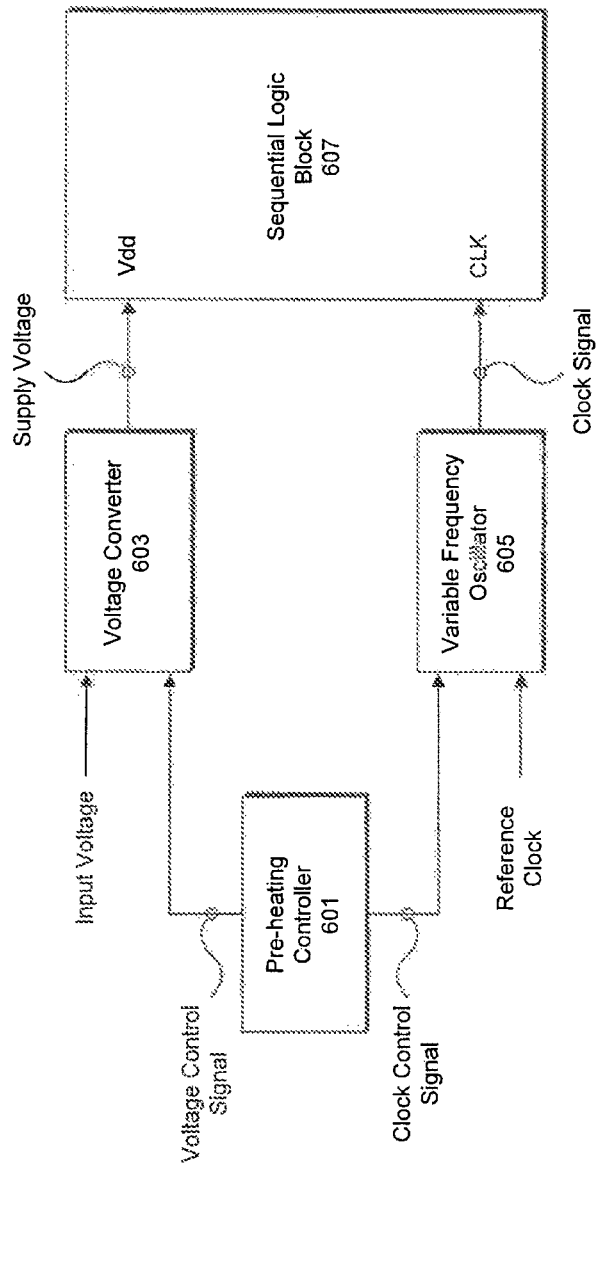
FIG. 6 illustrates an exemplary block diagram of a system for "pre-heating" logic that includes high threshold transistors, in accordance with embodiments of the present invention.

FIG. 6 illustrates an exemplary block diagram of a system 600 for "pre-heating" a sequential logic block that uses high threshold transistors, in accordance with an embodiment of the present invention. As discussed above, certain processes provide for the use of multiple different types of transistors with different threshold voltages in a single IC. Lower threshold transistors that are faster but have higher subthreshold leakage current can be used on the critical path of an IC, whereas higher threshold transistors that are slower but have lower subthreshold leakage current can be used on the non-critical paths of the IC to reduce static power dissipation where speed is less critical. However, it can be shown that, in certain processes, the speed at which high threshold transistors can operate decreases with decreasing temperature. Thus, the overall processing speed of a sequential logic block implemented in an IC using one or more high threshold transistors is often limited by the lowest temperature at which the IC is designed (or guaranteed) to properly function. System 600 overcomes this deficiency by "pre-heating" an IC (or at least portions of the sequential logic block in the IC that implement high threshold transistors) such that the IC can operate at a frequency (once "pre-heated") higher than what would otherwise be possible for a given, minimum temperature at which the IC is designed (or guaranteed) to properly function.

As illustrated in FIG. 6, system 600 specifically includes a pre-heating controller 601, a voltage converter 603, a variable frequency oscillator 605, and a sequential logic block 607 that includes high threshold transistors that slow down with decreasing temperature and, optionally, low threshold transistors (i.e., transistors with threshold voltages that are less than the threshold voltage of the high threshold transistors). Sequential logic block 607 is implemented in an IC, whereas pre-heating controller 601, voltage converter 603, and variable frequency oscillator 605 can be implemented in the same IC as sequential logic block 607, or as components external to the IC in which sequential logic block 607 is implemented. The high threshold transistors can be arranged in sequential logic block 607 to implement any number of different functions including, for example, a processor, memo radio frequency module for up-conversion/down-conversion and/or filtering, etc.

In operation, pre-heating controller 601 is configured to determine if a temperature associated with sequential logic block 607 is above or below a critical temperature. The critical temperature can be defined as the temperature below which sequential logic block 607 can no longer meet timing at a designed for, and intended, operating frequency and supply voltage Vdd. The operating frequency refers to the frequency of the clock signal used to clock the sequential elements of sequential logic block 607, and the supply voltage Vdd refers to the voltage level at which the logic implemented by the high threshold transistors in sequential logic block 607 is powered.

For example, assuming that sequential logic block 607 is designed for, and intended, to run, at an operating frequency of 700 MHz and a supply voltage of 1.2 V over a temperature range of −40° C. to 100° C., but is unable to meet timing at a temperature below −20° C., then the critical temperature is −20° C. Pre-heating controller 601 can determine if the temperature of sequential logic block 607 is above or below −20° C. (i.e., the critical temperature). If the temperature of sequential logic block 607 is above −20° C., then no "pre-heating" is necessary and sequential logic block 607 can be run at the designed for, and intended, operating frequency of 700 MHz and supply voltage Vdd of 1.2 V. However, if the temperature of sequential logic block 607 is below −20° C., then "pre-heating" can be performed by pre-heating controller 601 before sequential logic block 607 is run at the designed for, and intended, operating frequency of 700 MHz and/or supply voltage Vdd of 1.2 V to ensure timing is met. Timing is said to be met if all logic paths (at least some of which include high threshold transistors) between sequential elements like flip-flops and latches in sequential logic block 607 meet their setup and hold time requirements.

In one embodiment, pre-heating controller 601 can assume, upon power up of sequential logic block 607 (or based on some other condition), that the temperature of sequential logic block 607 is below the critical temperature of −20° C. and perform sufficient "pre-heating" to ensure that the temperature of sequential logic block 607 is above −20° C. before running sequential logic block 607 at the designed for, and intended operating frequency of 700 MHz and supply voltage Vdd of 1.2 V. Pre-heating controller 601 can specifically perform "pre-heating" in four different ways: (1) run sequential logic block 607 at a supply voltage Vdd above the designed for, and intended, voltage such that timing is met, while maintaining the operating frequency at the designed for, and intended, rate; (2) run sequential logic block 607 at a frequency below the designed for, and intended, operating frequency such that timing is met, while maintaining the supply voltage Vdd at the designed for, and intended, voltage; (3) run sequential logic block 607 at a supply voltage Vdd above the designed for, and intended, voltage and at an operating frequency below the designed for, and intended, rate such that timing is met; or (4) delay running sequential logic block 607 and run other logic in the IC that sequential logic block 607 is implemented.

In the first of the four "pre-heating" methods described above, the operating frequency of sequential logic block 607 is maintained at 700 MHz, while the supply voltage Vdd is increased above 1.2 V by pre-heating controller 601 using voltage converter 603. Voltage converter 603 can include, for example, a voltage regulator that performs DC-to-DC conversion or AC-to-DC conversion. In operation, voltage converter 603 receives an AC or DC input voltage and converts the input voltage to a supply voltage Vdd with a particular DC value. Pre-heating controller 601 can control the particular DC value of the supply voltage Vdd, provided by voltage converter 603 and used by sequential logic block 607, to power the high threshold transistors, via a voltage control signal.

By increasing the supply voltage Vdd, the speed at which the high threshold transistors of sequential logic block 607 operate at is increased. The supply voltage Vdd can be maintained at the higher voltage for a time sufficient to raise or ensure that the temperature of sequential logic block 607 is above the critical temperature of −20° C. Sequential logic block 607 temperature increases during this "pre-heating" time period from it being run (i.e., through self-heating). Pre-heating controller 601 can determine when the temper to sequential logic block 607 is above the critical temperature of −20° C. for based on, a number of clock cycles of the clock signal; iced to clock the logic of sequential logic block 607 that have elapsed, and/or based on an amount of energy estimated to have been consumed by one or more logic blocks of sequential logic block 607. Once pre-heating controller 601 determines that the temperature of sequential logic block 607 is above the critical temperature −20° C. and "preheating" has completed, the supply voltage Vdd can be restored to its designed for, and intended, operating value.

In the second of the three "pre-heating" methods described above, the supply voltage Vdd is maintained at 1.2 V, while the operating frequency of sequential logic block 607 is decreased below 700 MHz by pre-heating controller 601 using variable frequency oscillator 605. Variable frequency oscillator 605 can include, for example, a phased lock loop (PLL) that receives a reference clock and provides a clock signal with a frequency that is some integer or fractional multiple of the frequency of the reference clock. Pre-heating controller 601 can control the particular frequency of the clock signal, provided by variable frequency oscillator 605 and used by sequential logic block 607 to clock sequential storage elements like flip-flops or latches, via a clock control signal. The sequential storage elements are configured to store logic values produced, at least in part, by the high threshold transistors in sequential logic block 607.

By reducing the frequency of the clock signal below 700 MHz, timing of sequential logic block 607 can still be met at temperatures below the critical temperature of −20° C. The frequency of the clock signal can be maintained at the lower frequency for a time sufficient to raise or ensure that the temperature of sequential logic block 607 is above the critical temperature of −20° C. As noted above, pre-heating controller 601 can determine when the temperature of sequential logic block 607 is above the critical temperature of −20° C. based on, for example, a number of clock cycles of the clock signal used to clock the logic of sequential logic block 607 that have elapsed, and/or based on an amount of energy estimated to have been consumed by one or more logic blocks of sequential logic block 607. Once pre-heating controller 601 determines that the temperature of sequential logic block 607 is above −20° C. and "pre-heating" has completed, the frequency of the clock signal can be restored to its designed for, and intended, operating value.

The third "pre-heating" method described above involves a combination of the first two methods. In other words, the supply voltage Vdd is increased above its designed for, and intended, value and the frequency of the clock signal is reduced below its designed for, and intended, value for a time sufficient to raise or ensure that the temperature of sequential logic block 607 is above the critical temperature of −20° C.

The fourth and final "pre-heating" method described above involves delaying running sequential logic block 607 and running other blocks containing hardware (e.g., transistors) in the IC that sequential logic block 607 is implemented to generate heat. The heat produced by running these other block in the IC will increase the temperature of sequential logic block 607. Sequential logic block 607 can be delayed from running by pre-heating controller 601 for a time sufficient to raise or ensure that the temperature of sequential logic block 607 is above the critical temperature of −20° C. As noted above, pre-heating controller 601 can determine when the temperature of sequential logic block 607 is above the critical temperature of −20° C. based on, for example, a number of clock cycles of the clock signal used to clock the logic of sequential logic block 607 that have elapsed, and/or based on an amount of energy estimated to have been consumed by one or more logic blocks of sequential logic block 607. Once pre-heating controller 601 determines that the temperature of sequential logic block 607 is above −20° C. and "pre-heating" has completed, sequential logic block 607 can be run.

It should be noted that the other blocks can include real, functional blocks that are used to process and provide actual data and/or can include dummy blocks (e.g., a ring oscillator) that are used solely to generate heat. The other block can be referred to more generally as heating blocks.

It should be further noted that sequential logic block 607 can be delayed from running by, for example, ignoring the output data it produces, power gating its logic, and/or clock gating its sequential elements (e.g., flip-flops and latches).

It should also be further noted that sequential logic block 607 can be delayed from "running" in another sense during "pre-heating": it can be run, but primarily to generate heat, and the data it produces discarded until the temperature of sequential logic block 607 rises above, or is ensured to be above, the critical temperature. After pre-heating controller 601 determines that the temperature of sequential logic block 607 is above, or is ensured to be above, the critical temperature, sequential logic block 607 can be run and the data it produces used.

Figure 7:
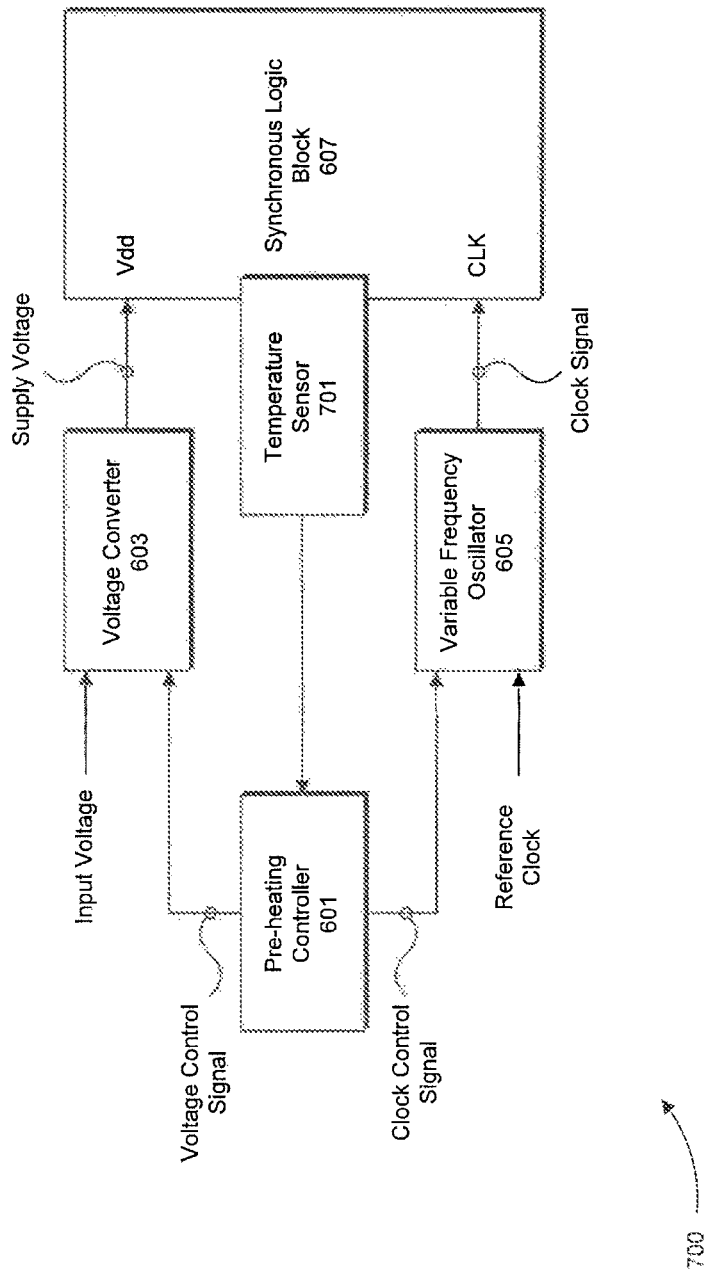
FIG. 7 illustrates another exemplary block diagram of a system for "pre-heating" logic that includes high threshold transistors, in accordance with embodiments of the present invention.

Finally, in regard to FIG. 6 generally, it should be noted that the specific temperature values and ranges used in the above description (i.e., −20° C., −40° C., and −100° C.) are provided for exemplary purposes only. Persons of ordinary skill in the art will recognize that other temperature values and ranges are possible without departing from the scope and spirit of the present invention. In addition, it should be noted that the designed for, and intended, specific operating frequency (i.e., 700 MHz) and supply voltage Vdd (i.e., 1.2 V) in the above description are provided for exemplary purposes only. Persons of ordinary skill in the art will recognize that other designed for, and intended, operating frequencies and supply voltages Vdd are possible without departing from the scope and spirit of the present invention Turning now to FIG. 7, an additional system 700 for "pre-heating" a sequential logic block that uses high threshold transistors is illustrated in accordance with an embodiment of the present invention. In general, system 700 includes the same structure as system 600 illustrated in FIG. 6 with the exception of an additional temperature sensor 701. Temperature sensor 701 is used to sense the temperature of synchronous logic block 607 (or portions of synchronous logic block 607). The sensed temperature can then be relayed to pre-heating controller 601 so that pre-heating controller 601 can determine whether "pre-heating" should be performed or ceased.

Figure 8:
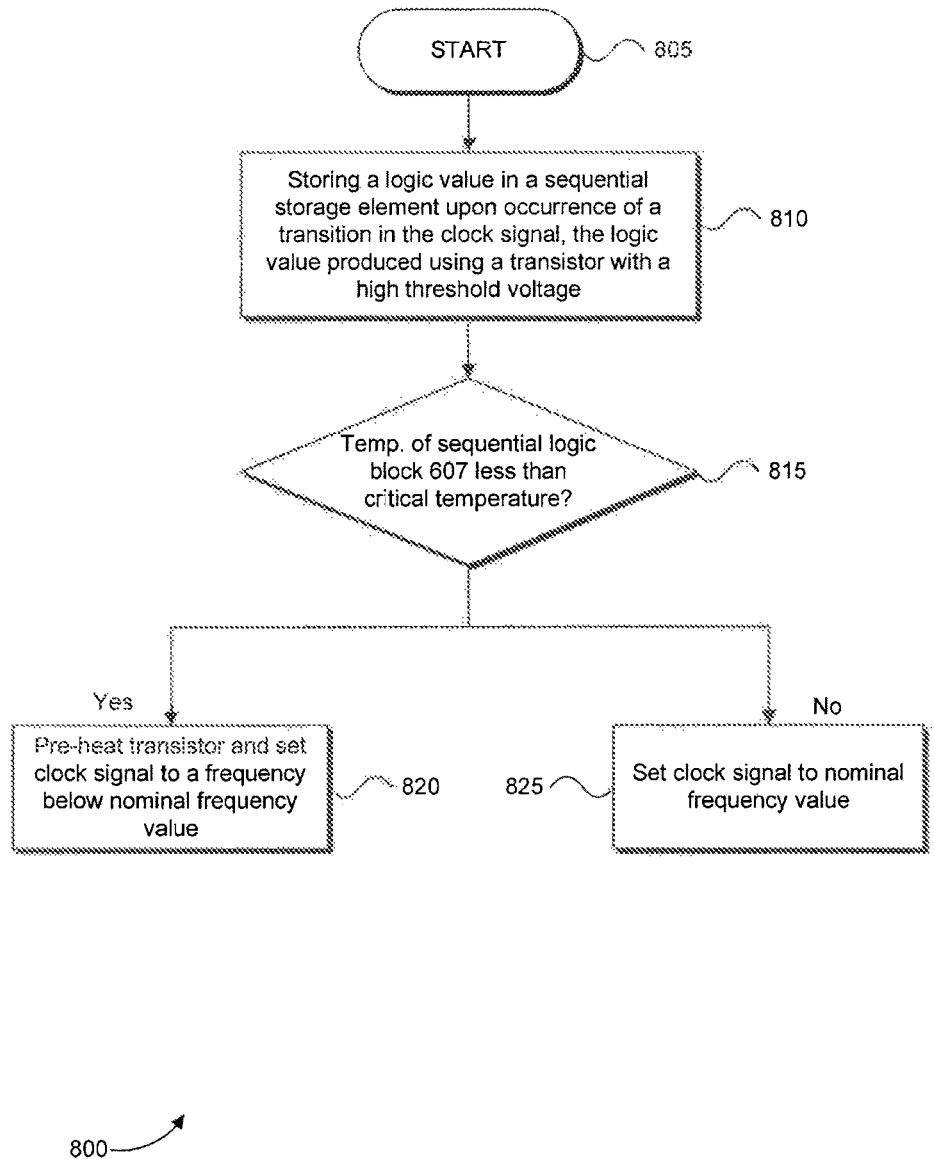
FIG. 8 illustrates a flowchart of an exemplary method for performing, "pre-heating" of logic that uses high threshold transistors, in accordance with embodiments of the present invention.

FIG. 8 illustrates a flowchart 800 of a method for "pre-heating" a sequential logic block that uses high threshold transistors, in accordance with an embodiment of the present invention. Flowchart 800 is described with continued reference to system 600 illustrated in FIG. 6. However, flowchart 800 is not limited to the embodiment. For example, flowchart 800 is equally applicable to system 700 illustrated in FIG. 7.

Flowchart 800 starts at step 805 and transitions to step 810. At step 810 a sequential storage element, in sequential logic block 607, stores a logic value produced at least in part by a high threshold transistor upon occurrence of a transition in the clock signal used to clock the logic of sequential logic block 607.

In step 815, pre-heating controller 601 determines whether the temperature of sequential logic block 607 is less than a critical temperature (e.g., −20° C. as used above). If the temperature of sequential logic block 607 is less than the critical temperature, flowchart 800 proceeds to step 820. Otherwise, if the temperature of sequential logic block 607 is greater than the critical temperature, flowchart 800 proceeds to step 825.

Assuming that the temperature of sequential logic block 607 is less than the critical temperature, flowchart 800 proceeds from step 815 to step 820. In step 820, pre-heating controller 601 sets the frequency of the clock signal used to clock the logic of sequential logic block 607 to a frequency below the designed for, and intended, operating frequency used to run (or clock) sequential logic block 607 (e.g., below 700 MHz as used above). Pre-heating controller 601 can maintain the frequency of the clock signal at the frequency below the nominal frequency value for a time sufficient to raise the temperature of sequential logic block 607 above the critical temperature, at which point the frequency of the clock signal can be restored to its designed for, and intended, value.

Assuming that the temperature of sequential logic block 607 is greater than the critical temperature, flowchart 800 proceeds from step 815 to step 825. In step 825, pre-heating controller 601 does not perform "pre-heating" and sets the clock signal to its designed for, and intended, value.

Figure 9:
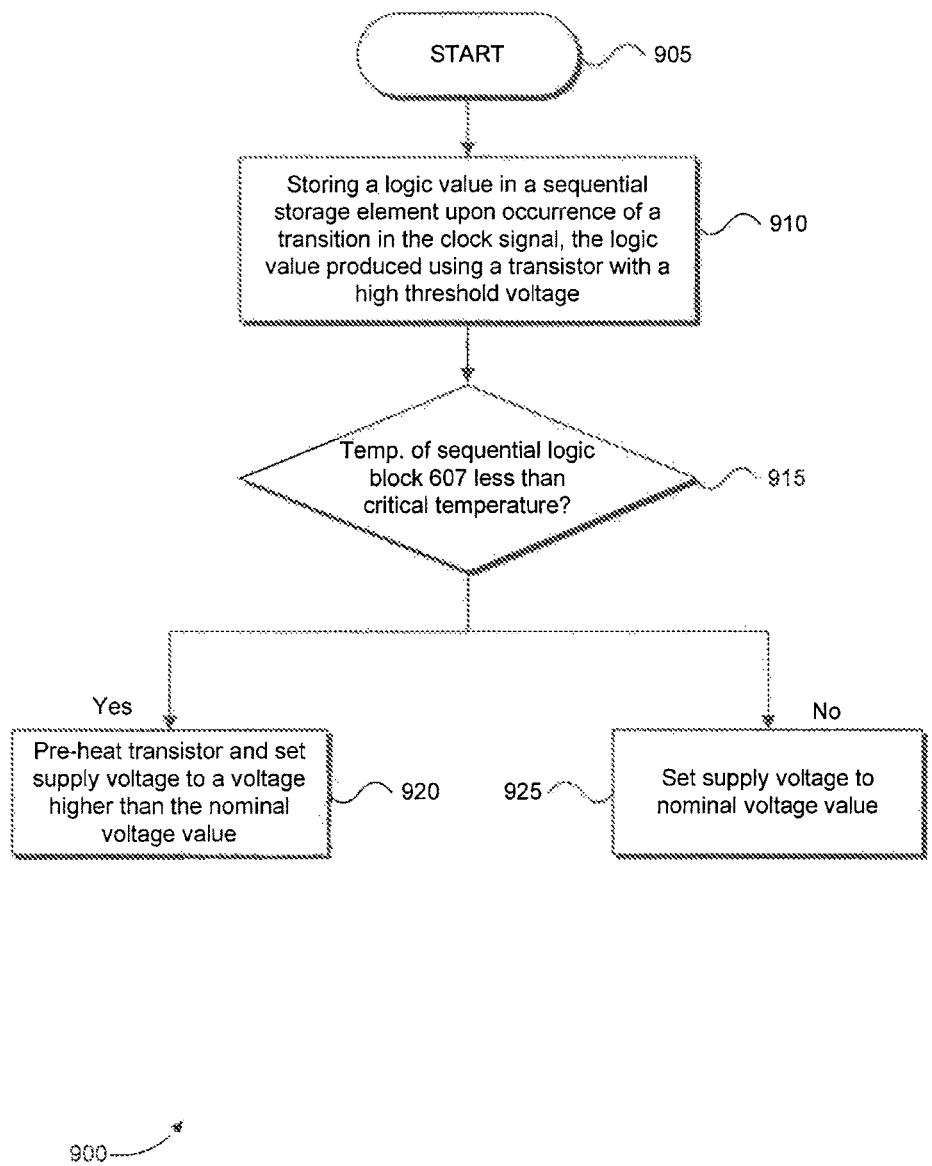
FIG. 9 illustrates a flowchart of an exemplary method for performing "pre-heating" of logic that uses high threshold transistors, in accordance with embodiments of the present invention.

FIG. 9 illustrates a flowchart 900 of a method for "pre-heating" a sequential logic block that uses high threshold transistors, in accordance with an embodiment of the present invention. Flowchart 900 is described with continued reference to system 600 illustrated in FIG. 6. However, flowchart 900 is not limited to the embodiment. For example, flowchart 900 is equally applicable to system 700 illustrated in FIG. 7.

Flowchart 900 starts at step 905 and transitions to step 910. At step 910 a sequential storage element, in sequential logic block 607, stores a logic value produced at least in part by a high threshold transistor upon occurrence of a transition in the clock signal used to clock the logic of sequential logic block 607.

In step 915, pre-heating controller 601 determines whether the temperature of sequential logic block 607 is less than a critical temperature (e.g., −20° C. as used above). If the temperature of sequential logic block 607 is less than the critical temperature, flowchart 900 proceeds to step 920. Otherwise, if the temperature of sequential logic block 607 is greater than the critical temperature, flowchart 900 proceeds to step 925.

Assuming that the temperature of sequential logic block 607 is less than the critical temperature, flowchart 900 proceeds from step 915 to step 920. In step 920, pro-heating controller 601 sets the supply voltage Vdd used to power the high threshold transistors of sequential logic block 607 to a supply voltage Vdd that is less than the designed for, and intended, supply voltage Vdd (e.g., 1.2 V as used above). Pre-heating controller 601 can maintain the supply voltage Vdd at the lower voltage level for a time sufficient to raise the temperature of sequential logic block 607 above the critical temperature, at which point the supply voltage Vdd can be restored to its designed for, and intended, value.

Assuming that the temperature of sequential logic block 607 is greater than the critical temperature, flowchart 900 proceeds from step 915 to step 925. In step 925, pre-heating controller 601 does not perform "pre-heating" and sets the supply voltage Vdd of sequential logic block 607 to its nominal value.

One additional embodiment of the present invention, not discussed above, involves the use of parallel paths of logic in sequential logic block 607 illustrated in FIG. 6. For example, sequential logic block 607 can include two, parallel paths of logic that each implement the same function. However, one of the two paths can be implemented with more high threshold transistors than the other path and, thereby, run at a slower speed but with less subthreshold leakage current than the other.

Pre-heating controller 601 can select to use one of these two paths based on the current temperature of sequential logic block 607. If sequential logic block 607 is below the critical temperature (e.g., −20° C. as used above), then pre-heating controller 601 can select the parallel path with less high threshold transistors and more low threshold transistors (i.e., transistors with threshold voltages that are comparatively lower than the high threshold transistors) for use within sequential logic block 607 in order to meet timing, while the other path is not used. If sequential logic block 607 is above the critical temperature, then pre-heating controller 601 can select the parallel path with more high threshold transistors for use within sequential logic block 607 in order to reduce static power consumption, while the other path is not used. It should be noted that, any of the parallel paths that are not in use within sequential logic block 607 at any given point in time, can be power gated to reduce subthreshold leakage current.

IV. EXAMPLE COMPUTER SYSTEM IMPLEMENTATION

It will be apparent to persons skilled in the relevant art(s) that various elements and features of the present invention, as described herein, can be implemented in hardware using analog and/or digital circuits, in software, through the execution of instructions by one or more general purpose or special-purpose processors, or as a combination of hardware and software.

Figure 10:
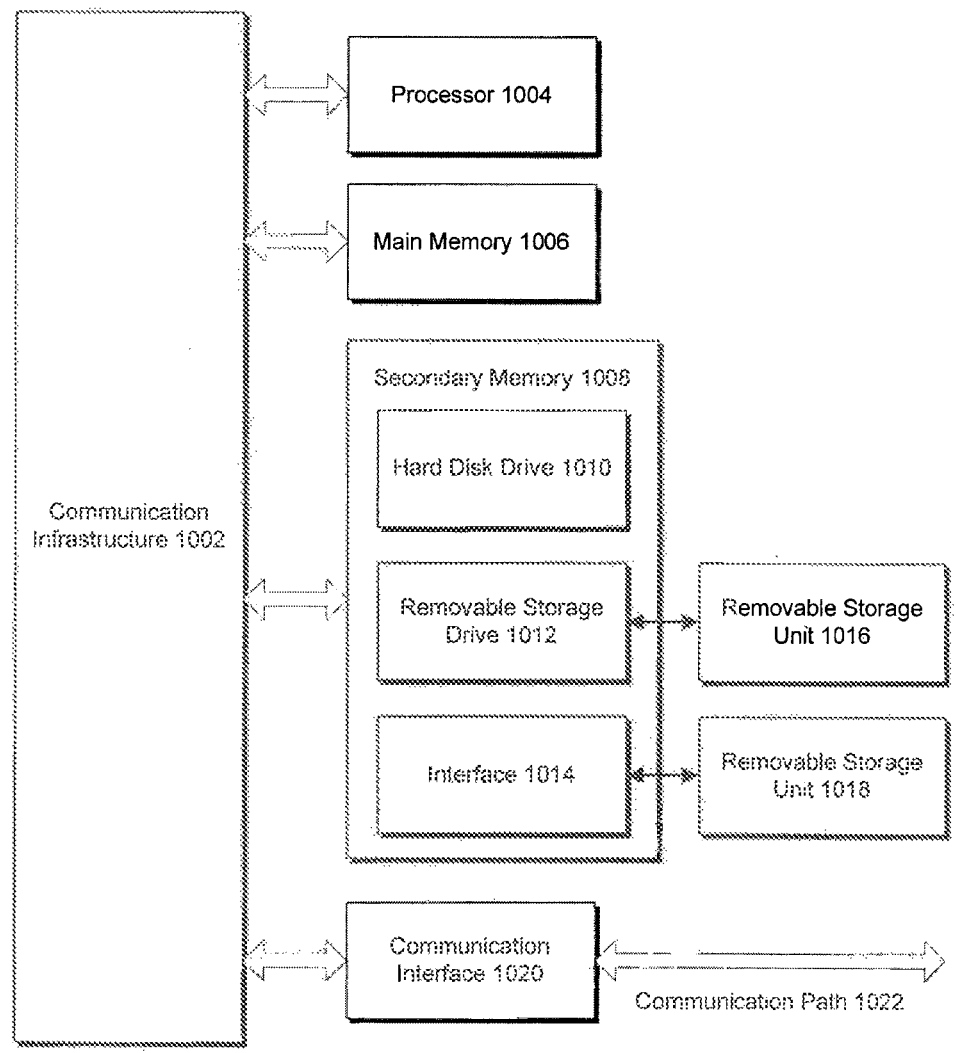
FIG. 10 illustrates an example computer system that can be used to implement aspects of the present invention.

The following description of a general purpose computer system is provided for the sake of completeness. Embodiments of the present invention can be implemented in hardware, or as a combination of software and hardware. Consequently, embodiments of the invention may be implemented in the environment of a computer system or other processing system. An example of such a computer system 1000 is shown in FIG. 10. Some of the modules depicted in FIGS. 6 and 7 (i.e., pre-heating controller 601, variable frequency oscillator 605, and temperature sensor 701) can execute on one or more distinct computer systems 1000. Furthermore, one or more of the steps of the flowcharts depicted in FIGS. 8 and 9 can be implemented on one or more distinct computer systems 1000.

Computer system 1000 includes one or more processors, such as processor 1004. Processor 1004 can be a special purpose or a general purpose digital signal processor. Processor 1004 is connected to a communication infrastructure 1002 (for example, a bus or network). Various software implementations are described in terms of this exemplary computer system. After reading this description, it will become apparent to a person skilled in the relevant art(s) how to implement the invention using other computer systems and/or computer architectures.

Computer system 1000 also includes a main memory 1006, preferably random access memory (RAM), and may also include a secondary memory 1008. Secondary memory 1008 may include, for example, a hard disk drive 1010 and/or a removable storage drive 1012, representing a floppy disk drive, a magnetic tape drive, an optical disk drive, or the like. Removable storage drive 1012 reads from and/or writes to a removable storage unit 1016 in a well-known manner. Removable storage unit 1016 represents a floppy disk, magnetic tape, optical disk, or the like, which is read by and written to by removable storage drive 1012. As will be appreciated by persons skilled in the relevant art(s), removable storage unit 1016 includes a computer usable storage medium having stored therein computer software and/or data.

In alternative implementations, secondary memory 1008 may include other similar means for allowing computer programs or other instructions to be loaded into computer system 1000. Such means may include, for example, a removable storage unit 1018 and an interface 1014. Examples of such means may include a program cartridge and cartridge interface (such as that found in video game devices), a removable memory chip (such as an EPROM, or PROM) and associated socket, a thumb drive and USB port, and other removable storage units 1018 and interfaces 1014 which allow software and data to be transferred from removable storage unit 1018 to computer system 1000.

Computer system 1000 may also include a communications interface 1020. Communications interface 1020 allows software and data to be transferred between computer system 600 and external devices. Examples of communications interface 1020 may include a modem, a network interface (such as an Ethernet card), a communications port, a PCMCIA slot and card, etc. Software and data transferred via communications interface 1020 are in the form of signals which may be electronic, electromagnetic, optical, or other signals capable of being received by communications interface 1020. These signals are provided to communications interface 1020 via a communications path 1022. Communications path 1022 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1016 and 1018 or a hard disk installed in hard disk drive 1010. These computer program products are means for providing software to computer system 1000.

Computer programs (also called computer control logic) are stored in main memory 1006 and/or secondary memory 1008. Computer programs may also be received via communications interface 1020. Such computer programs, when executed, enable the computer system 1000 to implement the present invention as discussed herein. In particular, the computer programs, when executed, enable processor 1004 to implement the processes of the present invention, such as any of the methods described herein. Accordingly, such computer programs represent controllers of the computer system 1000. Where the invention is implemented using software, the software may be stored in a computer program product and loaded into computer system 1000 using removable storage drive 1012, interface 1014, or communications interface 1020.

In another embodiment, features of the invention are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

V. CONCLUSION

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

In addition, while various embodiments have been described above, it should be understood that they have been presented by way of example only, and not limitation. It will be understood by those skilled in the relevant art(s) that various changes in form and details can be made to the embodiments described herein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:
1. A system comprising:
    a variable frequency oscillator configured to generate a clock signal to clock a sequential logic block; and a pre-heating controller configured to:
reduce a frequency of the clock signal if a temperature associated with the sequential logic block is determined to be below a particular temperature, and
pre-heat the sequential logic block if the temperature associated with the sequential logic block is determined to be below the particular temperature.

2. The system of claim 1, wherein the sequential logic block comprises a first device that has an operating speed that decreases with decreasing temperature of the first device.

3. The system of claim 2, wherein the sequential logic block comprises a storage element configured to store a logic value produced at least in part by the first device.

4. The system of claim 2, wherein the first device is configured to form an inversion layer at a first threshold voltage and is implemented on an integrated circuit with a second device, the second device configured to form an inversion layer at a second threshold voltage that is less than the first threshold voltage.

5. The system of claim 4, wherein the first device and the second device are transistors.

6. The system of claim 1, further comprising:
a temperature sensor configured to sense the temperature associated with the sequential logic block.

7. The system of claim 1, wherein the pre-heating controller is configured to determine whether the temperature associated with the sequential logic block is below or above the particular temperature based on a number of clock cycles of the clock signal that have elapsed.

8. The system of claim 1, wherein the pre-heating controller is configured to determine whether the temperature associated with the sequential logic block is below or above the particular temperature based on an amount of energy consumed by one or more logic blocks associated with the sequential logic block.

9. A method comprising:
generating a clock signal having a nominal operating frequency to clock a sequential logic block; and
setting a frequency of the clock signal below the nominal operating frequency based on a temperature associated with the sequential logic block being below a particular temperature.

10. The method of claim 9, wherein the sequential logic block comprises a first device that has an operating speed that decreases with decreasing temperature of the first device.

11. The method of claim 10, wherein the sequential logic block comprises a storage element configured to store a logic value produced at least in part by the first device.

12. The method of claim 10, wherein the first device is configured to form an inversion layer at a first threshold voltage and is implemented on an integrated circuit with a second device, the second device configured to form an inversion layer at a second threshold voltage that is less than the first threshold voltage.

13. The method of claim 12, wherein the first device and the second device are transistors.

14. The method of claim 9, further comprising:
sensing the temperature associated with the sequential logic block.

15. The method of claim 9, further comprising:
determining whether the temperature associated with the sequential logic block is below or above the particular temperature based on a number of clock cycles of the clock signal that have elapsed.

16. The method of claim 9, further comprising:
determining whether the temperature associated with the sequential logic block is below or above the particular temperature based on an amount of energy consumed by one or more logic blocks associated with the sequential logic block.

17. A system comprising:
a variable frequency oscillator configured to generate a clock signal to clock a sequential logic block; and
a pre-heating controller configured to:
set a frequency of the clock signal below a nominal operating frequency based on a temperature associated with the sequential logic block being below a particular temperature, and
pre-heat the sequential logic block based on the temperature associated with the sequential logic block being below the particular temperature.

18. The system of claim 17, wherein the sequential logic block comprises a first device that has an operating speed that decreases with decreasing temperature of the first device.

19. The system of claim 18, wherein the sequential logic block comprises a storage element configured to store a logic value produced at least in part by the first device.

* * * * *